(12) United States Patent
Sandford

(10) Patent No.: US 9,295,613 B2
(45) Date of Patent: Mar. 29, 2016

(54) CONTAINER WITH PH INDICATOR

(71) Applicant: Fenwal, Inc., Lake Zurich, IL (US)

(72) Inventor: Craig L. Sandford, Buffalo Grove, IL (US)

(73) Assignee: Fenwal, Inc., Lake Zurich, IL (US)

( * ) Notice: Subject to any disclaimer, the term of this patent is extended or adjusted under 35 U.S.C. 154(b) by 160 days.

(21) Appl. No.: 13/714,134

(22) Filed: Dec. 13, 2012

(65) Prior Publication Data
US 2013/0168279 A1 Jul. 4, 2013

Related U.S. Application Data

(60) Provisional application No. 61/570,176, filed on Dec. 13, 2011.

(51) Int. Cl.
| | | |
|---|---|---|
| *G01N 21/80* | (2006.01) | |
| *A61J 1/18* | (2006.01) | |
| *G01D 7/00* | (2006.01) | |
| *B65D 33/00* | (2006.01) | |
| *A61J 1/10* | (2006.01) | |

(52) U.S. Cl.
CPC .... *A61J 1/18* (2013.01); *A61J 1/10* (2013.01); *B65D 33/004* (2013.01); *G01D 7/005* (2013.01); *A61J 2200/70* (2013.01); *A61J 2205/20* (2013.01)

(58) Field of Classification Search
CPC .......... G01N 31/221; G01N 33/84; A61J 1/10
USPC ............. 206/438, 459.1, 569; 604/404, 408; 436/163
See application file for complete search history.

(56) References Cited

U.S. PATENT DOCUMENTS

| | | | |
|---|---|---|---|
| 4,029,597 A | | 6/1977 | Neisius et al. |
| 4,409,182 A | * | 10/1983 | Macklem ...................... 422/408 |
| 4,548,955 A | | 10/1985 | Okahata et al. |
| 4,827,944 A | * | 5/1989 | Nugent .......................... 600/584 |
| 5,039,492 A | * | 8/1991 | Saaski et al. ................ 422/82.09 |
| 5,160,329 A | * | 11/1992 | Oxley ............................ 604/317 |
| 5,196,001 A | * | 3/1993 | Kao ............................... 604/416 |
| 5,217,443 A | * | 6/1993 | Oxley ............................ 604/317 |
| 6,315,767 B1 | * | 11/2001 | Dumont et al. ............... 604/404 |
| 6,562,297 B1 | | 5/2003 | Bonstein et al. |
| 6,726,671 B2 | * | 4/2004 | Dumont et al. ............... 604/408 |
| 7,247,493 B2 | * | 7/2007 | Kopelman ..................... 436/163 |
| 7,790,113 B2 | * | 9/2010 | Putnam et al. ............. 422/82.03 |
| 2009/0221061 A1 | * | 9/2009 | Martin et al. ............... 435/288.4 |

OTHER PUBLICATIONS

Brochure of Blood Cell Storage, Inc.'s pH SAFE Technology from http://www.bloodcellstorage.com/businesses/phsafe/technology#content.

* cited by examiner

*Primary Examiner* — Anthony Stashick
*Assistant Examiner* — Blaine Neway
(74) *Attorney, Agent, or Firm* — Cook Alex Ltd.

(57) ABSTRACT

Containers with pH indicators are disclosed. The pH indicator is in contact with the contents of a container and detects changes in the pH of the contents.

25 Claims, 4 Drawing Sheets

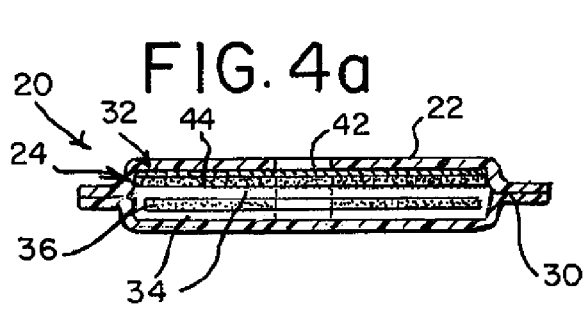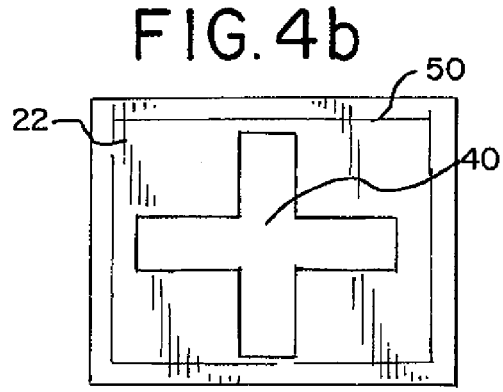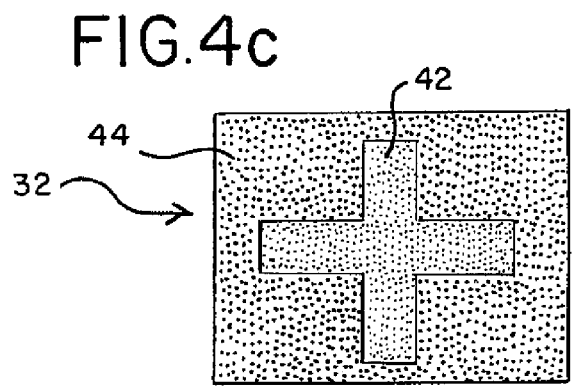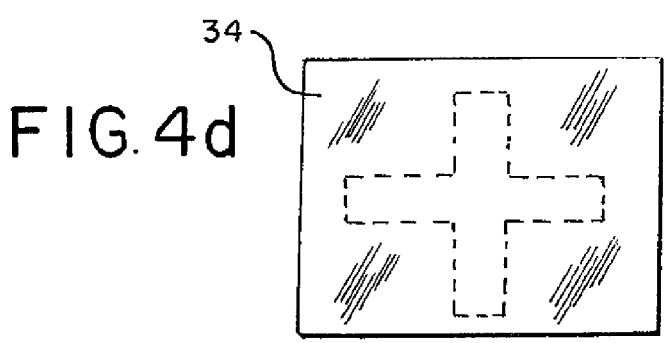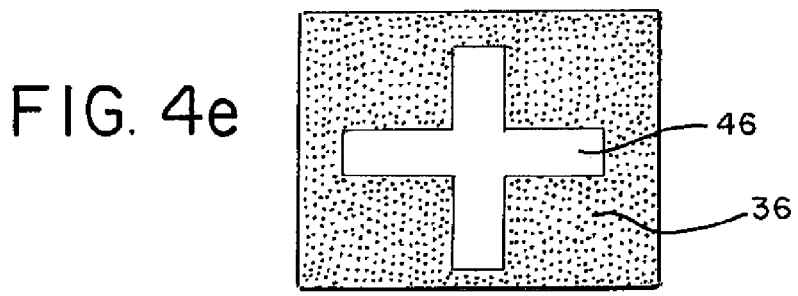

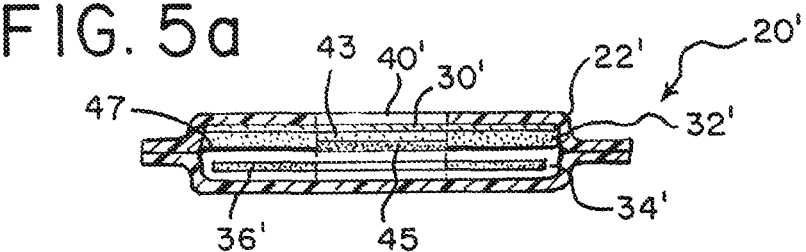
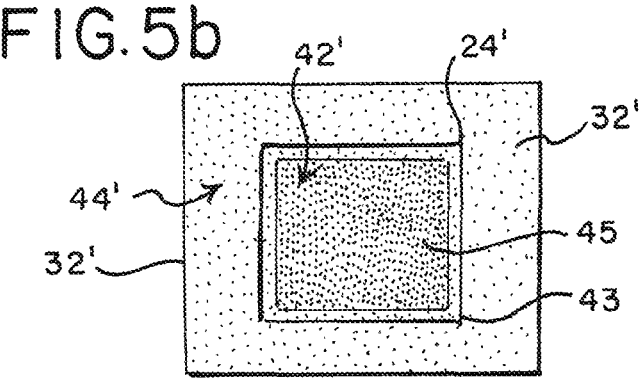
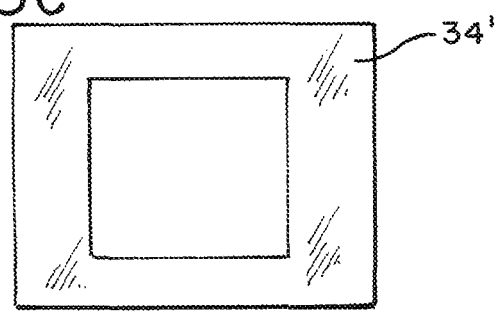
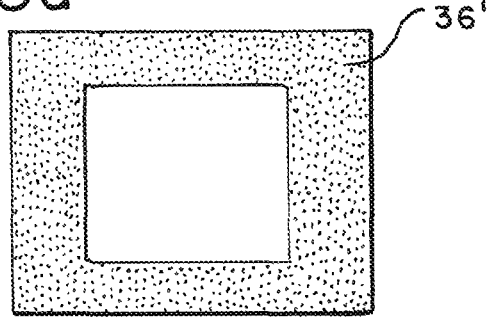

CONTAINER WITH PH INDICATOR

CROSS-REFERENCE TO RELATED APPLICATION

This application claims the benefit of U.S. Provisional Patent Application No. 61/570,176, filed Dec. 13, 2011, the contents of which is incorporated herein by reference.

BACKGROUND OF THE INVENTION

The present disclosure relates generally to the field of containers. The present disclosure relates specifically to detection of the pH of the contents of a container.

Certain solutions and materials (e.g., medical substances and solutions) are held by a container (e.g., a plastic bag, a PVC bag, etc.) and are maintained within the container at a certain pH or within a certain pH range. If the pH of the material held by the container changes such that the pH differs from the desired pH or falls outside of the desired pH range, the contents of the container may be unsuitable for use. The change in pH may indicate that the composition of the material held by the container may have changed during storage and/or may contain an undesired contaminant (e.g., microbial growth). The pH of container contents is commonly tested by removing a sample of the container contents from the container and testing using conventional pH detection equipment (e.g., a pH meter).

SUMMARY

In one aspect, the present disclosure relates to a pH indicating container configured to seal contents within the container. The container includes a sidewall having an inner surface, and the inner surface defines a cavity. The container also includes a pH indicator in communication with the cavity and configured to detect the pH of contents within the cavity while the container is sealed.

In another aspect, the present disclosure relates to a sealable polymer bag configured to store a therapeutic substance including a first sidewall made from a polymer material and a second sidewall made from a polymer material. The bag includes a hermetic seal joining the first sidewall to the second sidewall. The inner surfaces of the first sidewall and the second sidewall define a cavity configured to hold the therapeutic substance. The bag includes a pH indicator located within the cavity. The indicator includes a housing and a pH indicating element supported by the housing. The pH indicating element comprises a pH sensitive dye configured to change color if the therapeutic substance reaches a predetermined pH. Further, at least one of the first sidewall and the second sidewall are made from a light transmitting material such that the color of the pH sensitive dye is viewable from the outside of the bag.

In a further aspect, the present disclosure relates to a pH indicator for indicating the pH of a stored blood component. The indicator includes a housing and a pH indicating element coupled to the housing. The pH indicating element is configured to provide an indication of the pH of the stored blood component when placed in communication with the stored blood component.

Various embodiments of the invention disclosed herein relate to a container and a pH indicator including any combination of one or more features recited in the specification, claims and/or shown in the drawings. Alternative exemplary embodiments relate to other features and combinations of features as may be generally recited in the claims.

BRIEF DESCRIPTION OF THE DRAWINGS

This application will become more fully understood from the following detailed description, taken in conjunction with the accompanying Figures, wherein like reference numerals refer to like elements in which:

FIGS. 4a-4e show a pH indicator according to an exemplary embodiment;

FIG. 4f is an exploded view of the pH indicator of FIG. 4a; and

FIGS. 5a-5d show an alternative embodiment of a pH indicator of the present disclosure.

DETAILED DESCRIPTION

Before turning to the Figures, which illustrate the exemplary embodiments in detail, it should be understood that the present application is not limited to the details or methodology set forth in the description or illustrated in the Figures. It should also be understood that the terminology is for the purpose of description only and should not be regarded as limiting.

Referring generally to the Figures, various embodiments of a container are shown. Specifically, the containers discussed herein include one or more pH indicator elements or devices incorporated with the container. In the embodiments discussed below, the container includes a pH indicator including an indicating dye that changes color to indicate the pH of the contents of the container.

Figure 1:
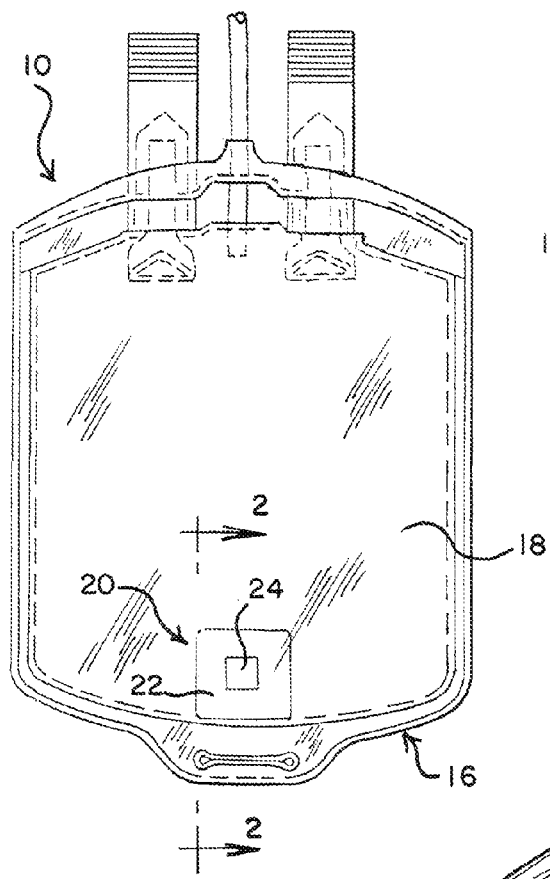
FIG. 1 is a schematic side view of a container according to an exemplary embodiment.
Figure 2:
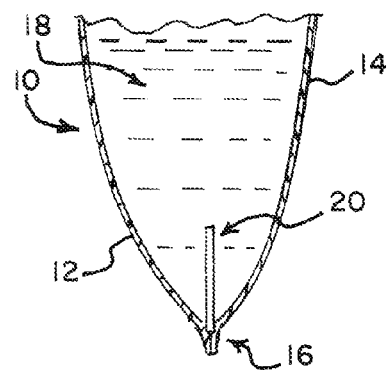
FIG. 2 is a schematic front view of a container according to an exemplary embodiment.
Figure 3:
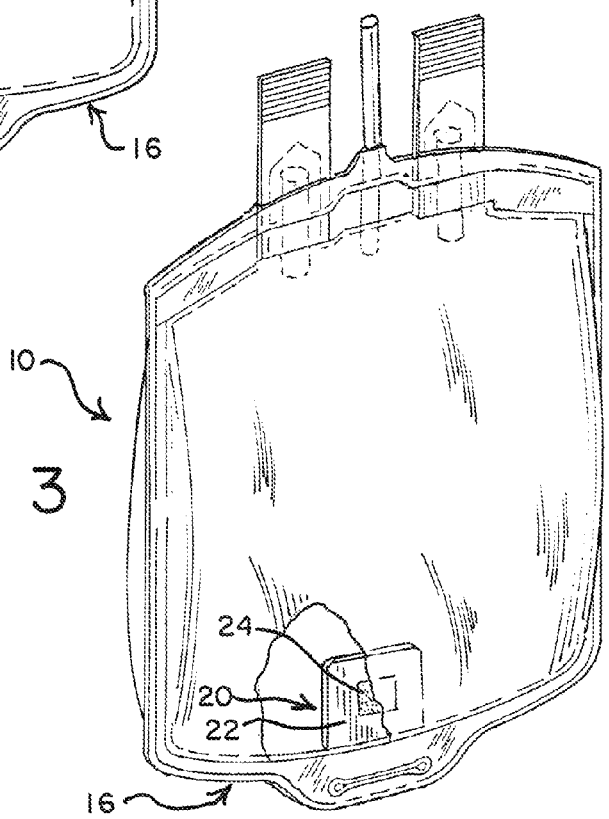
FIG. 3 is a schematic perspective view of a container according to an exemplary embodiment.

Referring to FIGS. 1-3, a container, shown as bag 10, is depicted according to an exemplary embodiment. Bag 10 includes a first sidewall 12 formed from a first sheet of material and a second sidewall 14 formed from a second sheet of material. The peripheral edges of sidewall 12 and sidewall 14 are coupled together by a hermetic seam or seal 16. The inner surfaces of sidewalls 12 and 14 define a container cavity 18 in which substances or materials (e.g., medical substances, medical solutions, biological material, etc.) may be held.

Generally, sidewalls 12 and 14 may be made of any suitable material such as, for example, a flexible material, and the first sidewall 12 may be made of the same or a different material as the second sidewall 14. More specifically, the material used for the first and/or second sidewalls 12 and 14 may vary depending on the materials to be stored in bag 10. In some exemplary embodiments, sidewalls 12 and 14 may each include a single layer plastic sheet. Alternatively, in other exemplary embodiments, sidewalls 12 and 14 may each include a multilayer plastic sheet. Additionally, the type of material used for sidewalls 12 and 14 may depend on the method (e.g., heating method, welding method, etc.) used to form seal 16. Some methods of forming seal 16 include, for example, direct heat sealing and/or RF sealing. In some examples, sidewalls 12 and 14 may be made of a RF-responsive plastic material or RF-responsive resin material to enable RE-welding to be utilized to form seal 16 of bag 10. Generally, RF-responsive resins are resins that may be heated by RF energy.

In some exemplary embodiments, sidewalls 12 and 14 have a thickness between about 1 mil and 10 mils depending on the type of sheets used (e.g., a single plastic sheet or a multilayer plastic sheet). A multilayer sheet may include a plurality of different plastic films adhered to one another to form a single sheet and may have properties not possessed by a single plastic sheet. Sidewalls 12 and 14 may be made of multilayer sheets if, for example, the substance to be contained in bag 10 is only compatible with particular types of materials (e.g., particular types of plastics) and/or the substance to be contained in bag 10 requires a material (e.g., plastic) that is substantially impenetrable to air, oxygen and/or moisture.

In exemplary embodiments, sidewalls 12 and 14 may be plastic or polymer sheets and specifically, may be a single layer of polyvinylchloride (PVC) film having a thickness of between about 3 mils and 18 mils. Typically, PVC film is compatible with whole blood as well as blood products and also may be used as a contacting surface for a wide variety of therapeutic solutions. Additionally, the PVC film is RF-responsive (e.g., RF-welding may be utilized to form the seams and seals of bag 10). However, any other suitable material or plastic resin may be utilized to produce sidewalls 12 and 14 such as, for example, non-PVC materials, non-DEHP materials, polyolefins, polyamides, polyesters, polybutadiene, styrene and hydrocarbon copolymers and mixtures thereof.

While FIGS. 1-3 show the container as a bag including a single cavity or compartment 18, various other types of containers may utilize the pH indicators discussed herein. For example, bag 10 may include multiple compartments each storing a different material separated by a frangible or peelable seal that may be broken allowing the materials of each compartment to be mixed prior to use. In other embodiments, other containers (e.g., tubes, vials, bottles, envelopes, boxes, ampules, syringes, canisters, etc.) may incorporate a pH indicator as discussed herein.

As shown in FIGS. 1-3, bag 10 includes a pH indicator, shown as pH indicator 20, that is in fluid communication with cavity 18 and, when bag 10 is filled, is in communication or in contact with the contents of container cavity 18. In contrast to a completely separate pH meter or test strip that may be used to test the pH of container contents by drawing a sample from the container, the pH indicator disclosed herein indicates pH while the container is sealed (e.g., hermetically sealed, unopened, maintained sterile, etc.), and does not require the container to be opened or a sample to be removed from the container in order to determine pH of the container contents.

In the embodiments discussed herein, pH indicator 20 is configured to provide a visual indication of the pH of the container contents and is specifically configured to change color in response to the pH of the container contents. In the embodiments shown, pH indicator 20 is formed as an indicator structure coupled to or captured by the lower portion of hermetic seal 16 and extends from seal 16 into cavity 18. In this embodiment, the material of sidewalls 12 and 14 is transparent or translucent such that the change in color experienced by pH indicator 20 within bag 10 is visible or viewable from the outside of bag 10 and specifically is viewable through the material of the sidewalls. In other embodiments, pH indicator 20 may be located in other positions relative to bag 10. For example, in one embodiment, pH indicator 20 is embedded in one of the sidewalls of bag 10 and, in another embodiment, pH indicator 20 is not coupled to the sidewalls of bag 10 and is free floating within cavity 18.

Indicator 20 includes a housing 22 and a pH indicating element, shown as pH sensing/indicating element or structure 24. Housing 22 provides the structure that is coupled to bag 10 and that supports pH sensing/indicating element 24. As explained in more detail below, pH sensing/indicating element 24 includes one or more pH reactive or sensitive dyes or solutions that changes color in response to the pH of the contents of the container. In this embodiment, the pH sensitive dye of pH sensing/indicating element 24 is configured or selected to change color at a predetermined pH. In one embodiment the predetermined pH is selected to indicate when the container contents should no longer be used or should be discarded.

It should be understood that while the pH indicator 20 discussed herein uses a pH sensitive color changing dye, other pH indicating elements may be used. For example, in one embodiment, pH indicator 20 may be an electronic pH sensor including one or more sensing electrodes in communication with the contents of bag 10, a processing circuit for determining pH based on signals received from the electrodes and an output device that displays information indicative of the pH determined by the processing circuit. In one such embodiment, the electronic pH sensor is embedded within the material of bag 10.

The containers discussed herein may be configured to contain any material for which pH indication of container contents is desirable. For example, the container may include therapeutic substances (e.g., a drug solution, nutraceutical solution, blood solution, blood component solution, saline solution, etc.). The therapeutic substances held by the containers discussed herein may include blood or a blood component (e.g., red blood cells, white blood cells, plasma, platelets, combinations thereof, etc.). The containers discussed herein may also contain a storage or preservative media or solution including for example, a platelet storage media, a platelet additive solution (PAS) (e.g., PAS 1, PAS 2, PAS 3, PAS 4, PAS 5, etc.), a red blood cell preservative (e.g., Adsol®, SAG-M, etc.) or a pathogen inactivation solution. Of course, the containers disclosed herein may also contain blood or blood components combined with a storage medium or additive solution for the blood or blood component.

Figure 4F:
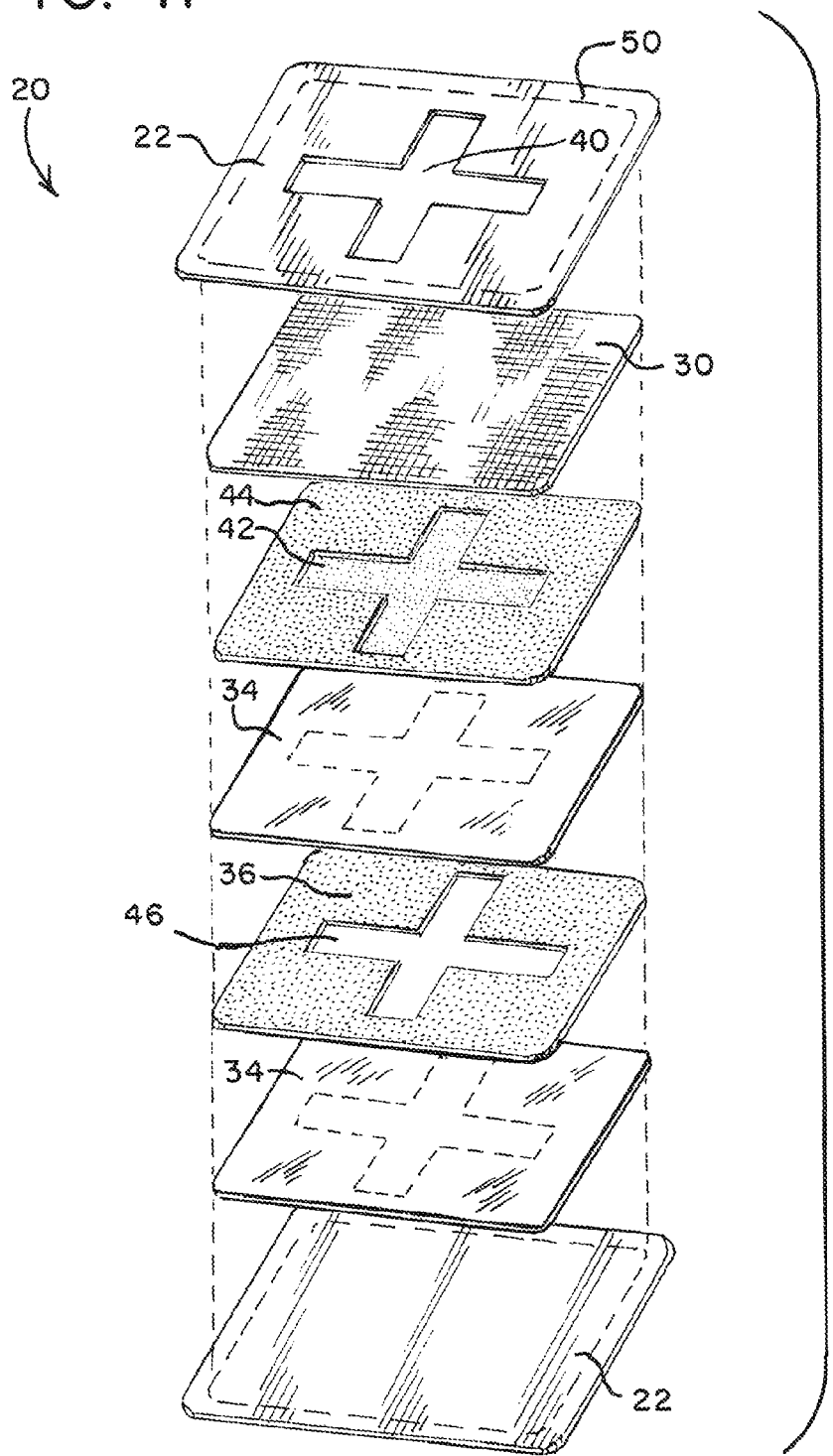

Referring to FIGS. 4a-4e, the structure of pH indicator 20 is shown according to an exemplary embodiment. FIG. 4a is a cross-sectional view of pH indicator 20, while FIG. 4f is an exploded view of the pH indicator 20. Referring to FIGS. 4a and 4f, housing 22 forms the outermost layer shown in FIG. 4a. As shown in FIG. 4a, pH sensing/indicating structure or element 24 is located within housing 22.

In the orientation shown in FIGS. 4a and 4f, the upper surface of indicator 20 is the content contacting side of indicator 20 and the lower surface is the indicating side of indicator 20. Moving from top to bottom, structure 24 includes a filter layer, shown as filter membrane 30, and an intermediate layer, shown as backing layer 32. Below backing (e.g., cellulose) layer 32 is a moisture barrier structure 34 and located within moisture barrier structure 34 is a color standard, shown as color standard 36.

Referring to FIGS. 4b and 4f, the content interfacing surface or face of housing 22 includes an opening, window or inlet 40. Opening 40 provides a flow path or fluid communication path from the container cavity to the pH sensing structure of indicator 20. Housing 22 may be made from a polymer material, and specifically, in one embodiment, housing 22 is made from ethylene vinyl acetate (EVA). In one embodiment, the polymer material of housing 22 is impermeable to fluids within bag 10 such that opening 40 is the only fluid path to the pH sensing structure of indicator 20. In one embodiment, the polymer material of housing 22 is transparent or translucent such that the pH sensing material within indicator 20 is viewable from the outside of bag 10.

Filter membrane 30 is located below the content interfacing surface of housing 22. In the embodiment shown, filter membrane 30 is preferably a nano-filter having pores sized or configured to allow passage of pH contributing molecules (such as low molecular weight molecules responsible for the pH of the container contents, for example low molecular weight acids and bases) through the membrane while preventing the passage of pH sensing materials and dyes through the membrane out of the indicator and into the cavity of the container. For example, the pores are sized large enough to permit passage of low molecular weight acids and bases but are small enough to prevent the pH sensing dyes from diffusing out of the pH sensing element into the container contents. In this manner, filter membrane 30 acts to allow the molecules responsible for the pH of the container contents to interact with the pH sensing dyes of indicator 20 while preventing the pH sensing dyes from diffusing into the contents of the container.

As will be understood, the selection of a particular filter for a particular application will depend on the molecular size of the pH sensing dye used and the pH contributing molecules in the container contents. In one embodiment in which bag 10 is configured to store a platelet suspension, the molecular weight cut-off for filter 30 will be between about 200-600 AMU, specifically between about 250-550 AMU, and more specifically between about 300-500 AMU.

As further shown in FIGS. 4a and 4f, located beneath filter membrane 30 is a support layer, shown as backing layer 32, coupled to the filter membrane 30. Backing layer 32 provides structural support for filter membrane 30. In one embodiment, backing layer 32 is formed from a porous material such as cellulose.

As shown in FIG. 4c, backing layer 32 includes two sections, a pH sensing dye section 42, and a sealed portion 44. Dye section 42 is a section of backing layer 32 that has absorbed one or more pH sensing dye (discussed below) that is configured to undergo a color change in response to a certain pH or a range of pH detected in the contents of bag 10. In the embodiment shown, dye section 42 is shaped to match the shape of or at least align with window 40 in housing surface 22. In the embodiment of FIG. 4a, dye section 42 is specifically cross-shaped. However, in other embodiments, other shapes may be used, as seen in FIGS. 5a-5d.

Because backing layer 32 is typically made from a porous material that will absorb the pH sensing dye, dye section 42 is preferably sealed from the surrounding portions of backing layer 32 to prevent migration of the dye out of dye section 42. In the embodiment shown in FIG. 4c, sealed portion 44 is a section of backing layer 32 that has been coated or printed with a low viscosity sealant material (e.g., polyurethane paint) that acts to seal the pH sensitive dye within dye section 42. Sealed portion 44 surrounds dye section 42 and prevents the pH sensitive dye from migrating out of dye section 42 and into sealed portion 44. As shown in FIG. 4a, membrane filter 30 is located between the content facing surface of housing 22 and both dye section 42 and sealed portion 44. Further, in this embodiment, the sealing material of sealed portion 44 may also be an adhesive material acting to couple backing layer 32 to the outer housing 22 and to the adjacent layers.

Referring to FIGS. 4d and 4e, moisture barrier structure 34 and printed color standard 36 are shown. Color standard 36 is a colored piece of material configured to enhance the contrast of the dye section 42 as it changes color due to the pH of the container contents. As shown, color standard 36 includes a window 46 through which dye section 42 is visible. Thus, when viewed from the viewing side (i.e., the lower side in the orientation of FIG. 4a), dye section 42 is surrounded by color standard 36. In one embodiment, the contents of bag 10 have a pH or range of pH at which the contents of bag 10 can be used (e.g., normal pH), and the contents of bag 10 have a pH or range of pH at which the contents of bag 10 should not be used (e.g., discard pH). In an embodiment using a dye-based pH detection system, the dye of indicator 20 will have at least a first color that indicates normal pH and a second color that indicates the discard pH. In various embodiments, the dye of indicator 20 and the color of color standard 36 are selected to have sufficient contrast at the discard pH such that the color change is easy to detect.

In one embodiment, color standard 36 is colored to match the color of dye section 42 at normal pH, and the dye of dye section 42 is selected such that the color of the dye at the discard pH is different from the color at the normal pH such that the color change can be visually detected. Thus, in this embodiment, if the contents of bag 10 remain at the normal or otherwise acceptable pH, indicator 20 displays a single color. If the contents of bag 10 are at the discard pH, dye section 42 changes color in response to the pH of the contents of bag 10 and dye section 42 becomes distinguishable from the surrounding color of color standard 36. In the embodiment shown, indicator 20 displays a cross-shaped pattern resulting from the color change of dye section 42 located within color standard 36 when the discard pH is detected. In this embodiment, moisture barrier structure 34 helps to seal color standard 36 from moisture that may be present within indicator 20. Blocking moisture from color standard 36 may help ensure that color standard 36 remains at the desired color even after being submersed within the contents of bag 10 for a period of time. As best seen in FIG. 4f, moisture barrier 34 may be made of two plies of suitable, liquid impermeable material with color standard sandwiched and captured between the plies of moisture barrier 34. The plies of moisture barrier 34 may be solid and transparent sheets of material or may include a window (cross-shaped or otherwise as shown in phantom lines) to allow for viewing of any color change.

In one embodiment, as discussed above, bag 10 is configured to store blood platelets. Blood platelets typically are maintained at or above pH 6.4 (e.g., the normal pH). If the pH of the stored platelets drops below pH 6.4 (i.e., drops to a predetermined discard pH), it indicates that platelets should not be used or should be discarded. After being collected and deposited in bag, platelets have a pH near 7.0. If there is a substantial drop in pH over the storage period, for example a drop to below 6.4, the drop in pH indicates that the platelets should be discarded.

Specifically, in one embodiment, if the pH of the stored platelets drops to about pH 6.2 (e.g., a discard pH), it indicates that the platelets should not be used. Accordingly, in one embodiment, the dye of dye section 42 is selected such that the color change at about pH 6.2 (e.g., plus or minus 0.001 pH, plus or minus 0.01 pH, plus or minus 0.02 pH, plus or minus 0.05 pH, etc.) is easy to visually detect relative to the color at pH 6.4. In this embodiment, the color of color standard 36 is selected to match the color of the dye of dye section 42 at pH 6.4. Thus, if dye section 42 changes color in response to a pH of 6.2 or less, the color change of the dye is contrasted relative to the surrounding color standard allowing the color change to be detected.

In another embodiment, the normal pH of the stored platelets is at or above about 6.4 and the predetermined discard pH is set at pH 6.35. If the pH of the stored platelets drops to about pH 6.35, it indicates that the platelets should not be used. Accordingly, in one embodiment, the dye of dye section 42 is selected such that the color change at about pH 6.35 (e.g., plus or minus 0.001 pH, plus or minus 0.01 pH, plus or minus 0.02 pH, plus or minus 0.05 pH, etc.) is easy to visually detect relative to the color at pH 6.4.

In various embodiments, dyes having different normal pHs and different discard pHs can be used based upon the normal pH and the discard pH for different materials that may be contained within bag 10. Further, in addition to providing sufficient visual contrast, the dye of dye section 42 may be selected be stable (i.e., does not change with time) for the shelf life of the of the contents of bag 10. Color stability may be desired in certain applications because the drop in pH may occur at any time following filling of bag 10, and the indicator should maintain the color difference during the entire shelf life to ensure that the color difference of the dye remains distinguishable at the time that the contents of bag 10 are to be used. In an embodiment in which bag 10 stores blood platelets, the dye of dye section 42 should be selected to be color stable at pH 6.2 or lower for at least the maximum storage time for stored platelets (e.g., seven days).

In various embodiments, the dye used for dye section 42 may be a mixture of two or more pH sensitive dyes. In determining the mixture of two or more pH sensitive dyes that will provide the desired color change at the desired pH, several factors are considered. For a particular pH dye, the relative concentrations of color forming ions can be determined at various pHs using the acid dissociation constant (pKa) of each dye. When mixing two or more dyes the relative concentrations of the color forming ions for each dye are used to select dyes such that the mixture has certain predetermined colors at different pHs. In addition to the relative concentration of the color forming ions, the color of each dye and the intensity of the color of each dye are considered to develop a dye mixture with particular colors at specific predetermined pHs. Using these factors, various mixtures of two or more pH sensitive dyes can be formed to have certain predetermined colors at predetermined pH ranges as may be desired for different applications.

In one embodiment, at least one dye used for dye section 42 has a pKa value of about 5.5 to 8. In another embodiment, two or more dyes for dye section 42 have a pKa value of about 5.5 to 8. In one embodiment, the first dye is selected based on the sensitivity to the desired discard pH and the second dye is selected to enhance the color change that occurs between the color at the normal pH and the color at the discard pH.

In one embodiment, the dye is a mixture of bromothymol blue and bromocresol purple having a discard pH of 6.35. In another embodiment, the dye is a mixture of nitrazine yellow and bromocresol purple having a discard pH of 6.35. In another embodiment, the dye is a mixture of nitrazine yellow and chlorophenol red having a discard pH of 6.35. In another embodiment, the dye is a mixture of bromothymol blue and propyl red. In another embodiment, the dye is a mixture of bromocresol purple and rosalic acid. In another embodiment, the dye is a mixture of propyl red and bromoxylenol blue. In another embodiment, the dye is a mixture of bromocresol purple and bromoxylenol blue. In another embodiment, the dye is a mixture of propyl red, bromocresol purple and bromothymol blue. In another embodiment, the dye is a mixture of propyl red and nitrazine yellow. In another embodiment, the dye is a mixture of chlorophenol red and bromoxylenol blue. In another embodiment, the dye is a mixture of chlorophenol red and bromothymol blue. In another embodiment, the dye is a mixture of chlorophenol red and bromothymol blue.

In other embodiments, as discussed below, particular relative mixtures of pH sensitive dyes are used to provide color change and suitable contrast at about pH 6.35. In one embodiment, the dye is a mixture of 0.75 parts bromothymol blue and 0.25 parts bromocresol purple. In another embodiment, the dye is a mixture of 0.5 parts nitrazine yellow and 0.25 parts bromocresol purple. In another embodiment, the dye is a mixture of 0.5 parts nitrazine yellow and 0.25 parts chlorophenol red.

In various embodiments, the dye may be a single pH indicating dye. In another embodiment, the dye is propyl red. In another embodiment, the dye is nitrazine yellow. In another embodiment, the dye is rosalic acid. In another embodiment, the dye is bromocresol purple. In another embodiment, the dye is bromothymol blue.

In some embodiments, the shelf life of the product may be relatively short (e.g., less than 24 hours, less than 48 hours, etc.). In other embodiments, indicator 20 may include a seal that prevents contact between the pH sensitive dye and the contents of the container prior to activation of indicator 20. In such embodiments, the indicator seal may be broken prior to use allowing for pH detection close to the time that the contents of bag 10 are to be used. In such embodiments, the color of the pH sensitive dye does not need to remain constant (i.e., does not need to be color stable) for a long period of time following pH detection. In such embodiments, in addition to the dyes and dye mixtures discussed in the preceding paragraphs, the dye may be a mixture of eriochrome (aka Mordant Black 11) and chlorophenol red. In another such embodiment, the dye is a mixture of bromocresol purple, eriochrome (aka Mordant Black 11) and bromothymol blue.

Referring to FIG. 4b (and FIG. 4f), housing 22 includes a heat seal 50. As shown, heat seal 50 extends around the perimeter of housing 22 along both the upper and lower surfaces of housing 22. Heat seal 50 provides a fluid tight seal that prevents the fluid contents of bag 10 from entering the indicator through the lateral edges of housing 22. Heat seal 50 also further prevents the dye material from exiting laterally from indicator 20 into the contents of bag 10. In particular, heat seal 50 provides a seal that prevents the dye material from migrating from dye section 42 around the lateral edges of the filter membrane 30. In the embodiment shown in FIG. 4a, the dye material and the sealing material may be applied to backing layer 30 prior to creation of heat seals 50.

While FIGS. 4a-4f depict a particular embodiment of pH indicator 20, in other embodiments other pH indicators may be used. In one embodiment, pH indicator 20 may be made from a pH sensing polymer material, and in other embodiments, a pH sensitive material (e.g., a pH sensitive dye) may be chemically bound (i.e., via covalent bond) to the material of housing 22 or chemically bound to the material inner surface of bag 10. In another embodiment, pH indicator 20 may be formed from a polymer material including a pH sensitive dye incorporated into the matrix of a polymer material. In one such embodiment, the pH sensitive material is mixed with a water permeable polyvinyl alcohol (PVA) cast film. The film is then radiation cross-linked binding the pH sensitive material within the PVA substrate.

FIGS. 5a-5d show an alternative embodiment of pH indicator 20, in accordance with the present disclosure. The embodiment of FIG. 5a shares much of the same structure with that of the FIG. 4a embodiment, including housing 22', filter membrane 30', backing layer 32' with pH indicating element 24', moisture barrier 34' and color standard 36'. In the embodiment of FIGS. 5a-5d, pH indicating element 24 has a different geometry, while the "top" surface of housing 22' may have a cross-shaped opening or window 40', as in the embodiment of FIG. 4a. Color standard 36' and moisture barrier 34' may optionally have a cross-shaped window or a window shape that matches the shape of dye section 42' in backing layer 32'. Specifically, as shown in FIG. 5a or 5b-5d, the pH indicating element 24' may have a square shaped profile.

In addition, pH indicator 20' may further include a dye section 42' having a layer 43 made from the material (e.g., cellulose) of backing layer 32' with dye added to it and layer 45 made of a dye dissolved in a suitable solvent. A structure as described above reduces the tendency of the dye to migrate and thus, provides a more uniform color. In one embodiment, the solvent may be polyvinyl alcohol. Also, as shown in FIG. 5a, a layer of adhesive 47 may be included between the filter assembly, i.e., membrane 30' with cellulose backing 32' and the moisture barrier 34' with encapsulated color standard 36'.

Further modifications and alternative embodiments of various aspects of the invention will be apparent to those skilled in the art in view of this description. Accordingly, this description is to be construed as illustrative only. The construction and arrangements, shown in the various exemplary embodiments, are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. Some elements shown as integrally formed may be constructed of multiple parts or elements, the position of elements may be reversed or otherwise varied, and the nature or number of discrete elements or positions may be altered or varied. The order or sequence of any process, logical algorithm, or method steps may be varied or re-sequenced according to alternative embodiments. Other substitutions, modifications, changes and omissions may also be made in the design, operating conditions and arrangement of the various exemplary embodiments without departing from the scope of the present invention.

For purposes of this disclosure, the term "coupled" means the joining of two components directly or indirectly to one another. Such joining may be stationary in nature or movable in nature. Such joining may be achieved with the two members and any additional intermediate members being integrally formed as a single unitary body with one another or with the two members or the two members and any additional member being attached to one another. Such joining may be permanent in nature or alternatively may be removable or releasable in nature.

The invention claimed is:

1. A pH indicating container comprising:
a pair of sidewalls each having an inner surface, the inner surfaces defining a sealed cavity between said sidewalls;
a pH indicator within the sealed cavity and configured to detect the pH of contents within the sealed cavity; and
said pH indicator comprising a housing having a housing wall defining a peripherally sealed housing interior, said housing interior containing a backing layer comprising a dye section within said backing layer, said dye section surrounded by and sealed from the remainder of said backing layer to prevent dye from said dye section from migrating into said remainder, said housing including a window in said wall providing flow communication between said dye section and said container sealed cavity.

2. The pH indicating container of claim 1, wherein the pH indicator is coupled to the sidewall and extends into the sealed cavity of the container.

3. The pH indicating container of claim 2, wherein the pH indicator provides a visual indication of the pH of the container contents and the sidewall is configured such that the pH indicator is viewable from outside of the container.

4. The pH indicating container of claim 1, wherein the pH indicator includes a pH sensitive dye in communication with the sealed cavity of the container, the pH sensitive dye configured to change color at a predetermined pH.

5. The pH indicating container of claim 4, wherein the pH sensitive dye is configured to change color at a pH below about 6.4.

6. The pH indicating container of claim 4, wherein the pH sensitive dye is configured to change color at a pH of about 6.35.

7. The pH indicating container of claim 4, wherein the pH sensitive dye is configured to change color at a pH of about 6.2.

8. The pH indicating container of claim 4, wherein the pH sensitive dye is a mixture of at least two different pH sensitive dyes.

9. The pH indicating container of claim 8, wherein the pH sensitive dye mixture is selected from the group consisting of a bromothymol blue/bromocresol purple mixture, a nitrazine yellow/bromocresol purple mixture and a nitrazine yellow/chlorophenol red mixture.

10. The pH indicating container of claim 4, wherein the pH sensitive dye is configured to have a first color at a first pH and to have a second color at a second pH, and further wherein the pH indicator further comprises a color standard adjacent to the pH sensitive dye, wherein the color of the color standard is the same as the first color.

11. The pH indicating container of claim 4, comprising a filter membrane located between the pH sensitive dye and the cavity of the container, the filter membrane having a pore size configured to permit passage of pH contributing molecules from the cavity of the container to the pH sensitive dye and configured to prevent passage of the pH sensitive dye from the pH indicator into the sealed cavity of the container.

12. The pH indicating container of claim 11, wherein the filter membrane has a molecular weight cut-off between about 200-600 AMU.

13. The pH indicating container of claim 4, further comprising a therapeutic substance located within the cavity.

14. The pH indicating container of claim 13, wherein the therapeutic substance comprises a blood component.

15. The pH indicating container of claim 14, wherein the therapeutic substance comprises platelets.

16. The pH indicating container of claim 14, wherein the container is a hermetically sealable polymer bag.

17. A polymer bag configured to store a therapeutic substance comprising:
a first sidewall made from a polymer material;
a second sidewall made from a polymer material;
a hermetic seal joining the first sidewall to the second sidewall, wherein inner surfaces of the first sidewall and the second sidewall define a sealed cavity configured to hold the therapeutic substance;
a pH indicator located within the sealed cavity, the indicator comprising:
a housing defining a sealed housing interior, said housing including a window;
a pH indicating element contained within the housing of the pH indicator, the pH indicating element comprising a pH sensitive dye configured to change color if the therapeutic substance reaches a predetermined pH;
a backing layer comprising a dye section within said backing layer;
and a color standard contained within and sandwiched between walls of a moisture barrier structure, wherein said moisture barrier structure is contained within said pH indicator housing interior;

wherein at least one of the first sidewall and the second sidewall of said bag are made from a light transmitting material such that the color of the pH sensitive dye is viewable from the outside of the bag.

18. A pH indicator for indicating the pH of a stored blood component comprising:

a housing having an outer perimeter and including opposed surfaces sealed together along at least a portion of said perimeter to define a housing defining an interior chamber; and a pH indicating element contained within the housing, the pH indicating element comprising:

a backing layer comprising a dye section within said backing layer surrounded by and sealed from the remainder of said backing layer to prevent dye from said dye section from migrating into said remainder;

and a color standard separate from said backing layer sandwiched between walls of a moisture barrier structure, wherein said moisture barrier structure is contained within said pH indicator housing.

19. The pH indicator of claim 18, further comprising a filter membrane located within the indicator housing interior and interposed between said housing and said backing layer, wherein the pH indicator element includes a pH sensitive dye and further wherein the filter membrane includes pores sized to (a) permit passage of pH contributing molecules from the stored blood component to the pH sensitive dye and (b) prevent passage of the pH sensitive dye from the pH indicator element into the stored blood component.

20. The pH indicator of claim 1 further comprising a color standard contained within a moisture barrier structure within said indicator housing interior.

21. The pH indicator of claim 19 further comprising a window in said housing.

22. The container of claim 1 wherein said window has a defined geometric shape and provides a flow path between the container cavity and said backing layer.

23. The pH indicator of claim 18 wherein said color standard comprises a sheet including a window therein.

24. The pH indicator of claim 23 wherein said window in said color standard is aligned with said dye section.

25. The pH indicator of claim 23 wherein said color standard is sealed within a moisture barrier comprising a pair of transparent walls.

* * * * *